US009777485B2

(12) United States Patent
Boyd

(10) Patent No.: US 9,777,485 B2
(45) Date of Patent: Oct. 3, 2017

(54) MAGNETIC BACKSPLASH DEVICE

(71) Applicant: Dena Boyd, Palatka, FL (US)

(72) Inventor: Dena Boyd, Palatka, FL (US)

(*) Notice: Subject to any disclaimer, the term of this patent is extended or adjusted under 35 U.S.C. 154(b) by 0 days.

(21) Appl. No.: 14/921,046

(22) Filed: Oct. 23, 2015

(65) Prior Publication Data

US 2017/0114547 A1   Apr. 27, 2017

(51) Int. Cl.
*E04F 13/075* (2006.01)
*F16B 1/00* (2006.01)
*E04F 13/30* (2006.01)
*F16B 47/00* (2006.01)
*E04F 13/24* (2006.01)
*E04F 13/073* (2006.01)

(52) U.S. Cl.
CPC .......... *E04F 13/075* (2013.01); *E04F 13/073* (2013.01); *E04F 13/24* (2013.01); *E04F 13/30* (2013.01); *F16B 1/00* (2013.01); *F16B 47/003* (2013.01); *F16B 2001/0035* (2013.01)

(58) Field of Classification Search
CPC ....... E04F 13/075; E04F 13/30; E04F 13/073; E04F 13/24; F16B 1/00; F16B 47/003; F16B 2001/0035
See application file for complete search history.

(56) References Cited

U.S. PATENT DOCUMENTS

| 1,982,560 | A | * | 11/1934 | Williams | ............ | E04F 13/0801 |
| | | | | | | 52/387 |
| 2,715,289 | A | | 8/1955 | Gale | | |
| 2,938,376 | A | * | 5/1960 | Workman | ............ | E04F 13/0862 |
| | | | | | | 52/314 |
| 3,001,902 | A | * | 9/1961 | Cooke | ............ | E04F 15/10 |
| | | | | | | 156/257 |
| D203,111 | S | | 12/1965 | Lansky | | |
| 3,378,974 | A | | 4/1968 | Bush, Jr. | | |
| 4,567,704 | A | * | 2/1986 | Bernett | ............ | E04F 13/0862 |
| | | | | | | 428/49 |
| 4,953,341 | A | * | 9/1990 | Joos | ............ | E01C 5/006 |
| | | | | | | 33/404 |
| 4,987,712 | A | * | 1/1991 | Mancuso | ............ | E04F 13/0862 |
| | | | | | | 52/387 |
| 5,238,721 | A | | 8/1993 | Nakazawa | | |
| 5,271,200 | A | | 12/1993 | Witt | | |
| 5,927,033 | A | * | 7/1999 | Kreckl | ............ | E04F 13/0883 |
| | | | | | | 156/310 |
| D529,627 | S | | 10/2006 | Yu | | |
| D530,026 | S | | 10/2006 | Yu | | |
| 7,225,717 | B2 | * | 6/2007 | Williams | ............ | F41H 7/04 |
| | | | | | | 89/36.01 |

(Continued)

FOREIGN PATENT DOCUMENTS

JP         11117497 A  *  4/1999

*Primary Examiner* — Phi A
*Assistant Examiner* — Omar Hijaz

(57) ABSTRACT

A magnetic backsplash device facilitates placement of a decorative and easy to clean backsplash on a magnetically attractive surface. The device includes a backing having a magnetic back face wherein the backing is configured for coupling to a magnetically attractive surface. An adhesive couples each of a plurality of tiles to a front surface of the backing defining a backsplash panel configured for being displayed over the magnetically attractive surface when the backing is coupled to the magnetically attractive surface.

5 Claims, 3 Drawing Sheets

(56) References Cited

U.S. PATENT DOCUMENTS

| | | |
|---|---|---|
| 7,941,988 B2 | 5/2011 | Mars |
| 9,187,909 B2 * | 11/2015 | Lee .................. E04F 15/02038 |
| 2004/0229020 A1 * | 11/2004 | LaBorde .................. B32B 3/02 |
| | | 428/192 |
| 2005/0284062 A1 | 12/2005 | Hsich |
| 2006/0101753 A1 | 5/2006 | Cheng et al. |
| 2012/0000156 A1 | 1/2012 | Esposito |
| 2015/0211236 A1 * | 7/2015 | Bowden .............. E04F 13/0885 |
| | | 428/41.8 |

* cited by examiner

MAGNETIC BACKSPLASH DEVICE

BACKGROUND OF THE DISCLOSURE

Field of the Disclosure

The disclosure relates to backsplash devices and more particularly pertains to a new backsplash device for facilitating placement of a decorative and easy to clean backsplash on a magnetically attractive surface.

SUMMARY OF THE DISCLOSURE

An embodiment of the disclosure meets the needs presented above by generally comprising a backing having a magnetic back face wherein the backing is configured for coupling to a magnetically attractive surface. An adhesive couples each of a plurality of tiles to a front surface of the backing defining a backsplash panel configured for being displayed over the magnetically attractive surface when the backing is coupled to the magnetically attractive surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
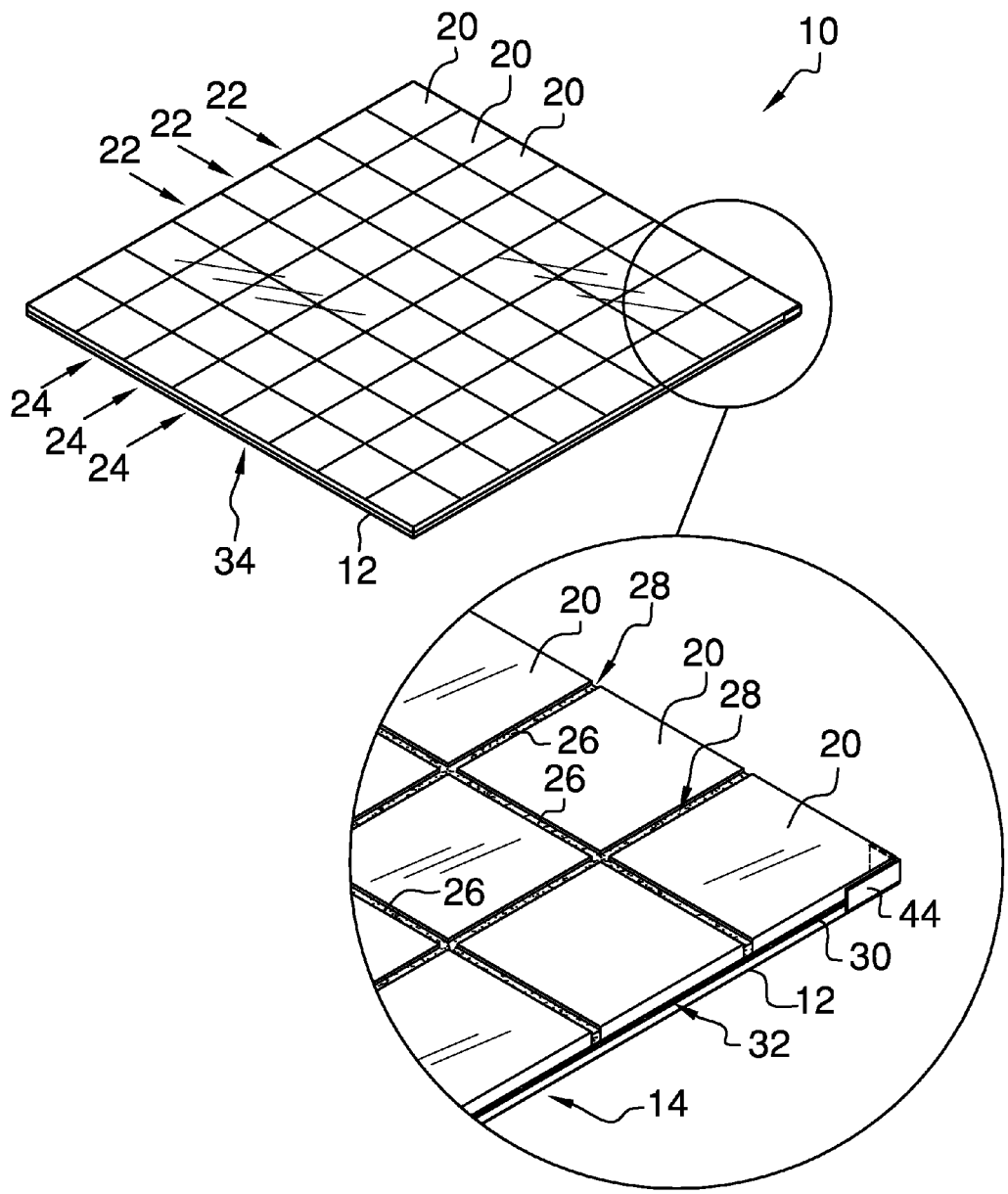
FIG. 1 is a top front side perspective and detailed view of a magnetic backsplash device according to an embodiment of the disclosure.
Figure 2:
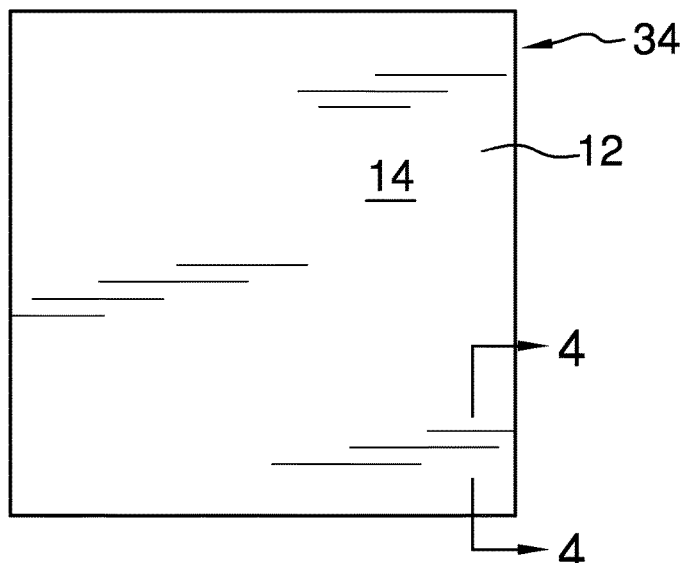
FIG. 2 is a back view of an embodiment of the disclosure.
Figure 3:
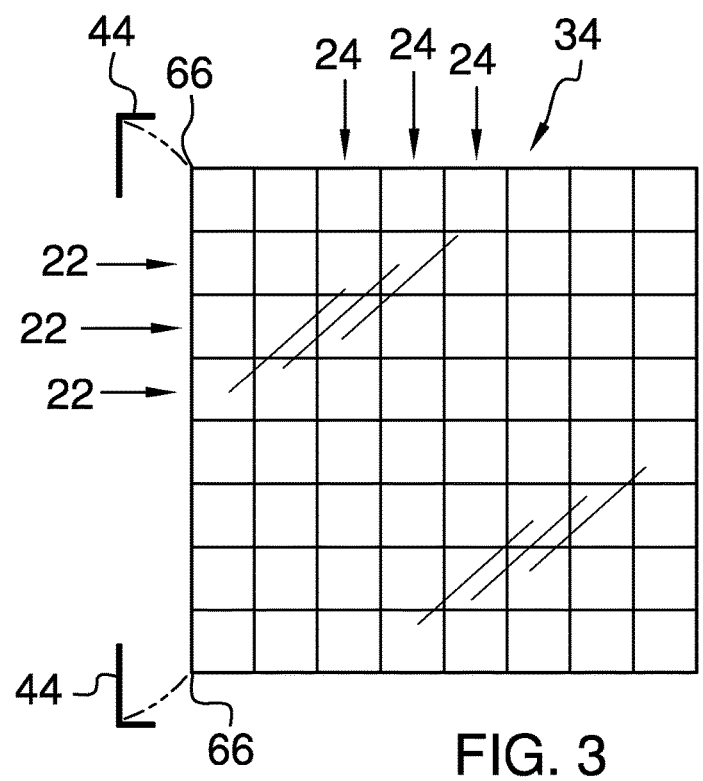
FIG. 3 is a front view of an embodiment of the disclosure.
Figure 4:
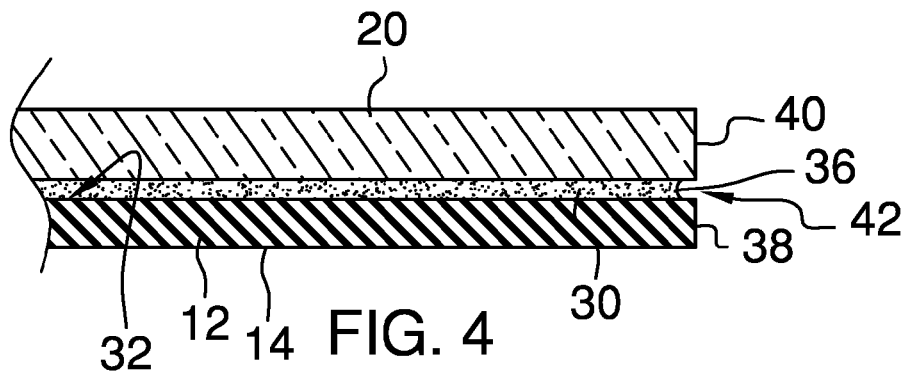
FIG. 4 is a cross-sectional view of an embodiment of the disclosure taken along line 4-4 of FIG. 2.
Figure 5:
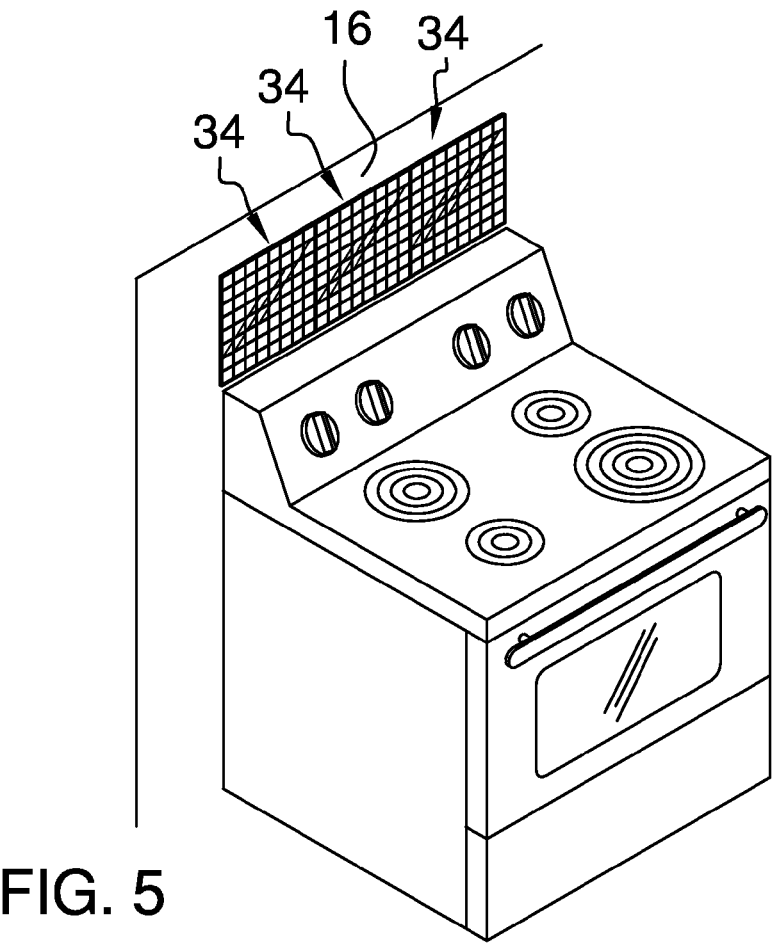
FIG. 5 is a top front side perspective view of an embodiment of the disclosure in use.

With reference now to the drawings, and in particular to FIGS. 1 through 5 thereof, a new backsplash device embodying the principles and concepts of an embodiment of the disclosure and generally designated by the reference numeral 10 will be described.

As best illustrated in FIGS. 1 through 5, the magnetic backsplash device 10 generally comprises a backing 12. The backing 12 has a magnetic back face 14 wherein the backing 12 is configured for coupling to a magnetically attractive surface 16. Additionally, the backing 12 is formed of a conventional magnetic sheet material allowing for flexibility and attachment to other flat non-magnetic surfaces using conventional fasteners such as glue or the like. The magnetically attractive surface 16 may be a prepared flat surface installed on a wall, a surface which is an integral part of a backsplash on an appliance such as a stove, or may be a face on an appliance such as a refrigerator.

Each of a plurality of tiles 20 is coupled to the backing 12 and arranged into a plurality of rows 22 and columns 24. Each of the tiles 20 is glass, ceramic, or the like used in tiling and conventional backsplash construction. Grouting 26 is positioned in gaps 28 between the rows 22 and the columns 24.

An adhesive 30 couples each of the tiles 20 to a front surface 32 of the backing 12 defining a backsplash panel 34 configured for being displayed over the magnetically attractive surface 16 when the backing 12 is coupled to the magnetically attractive surface 16. The backsplash panel 34 is rectangular and may be square having a height and width between 15 and 45 centimeters. The adhesive 30 as applied to the backing 12 and tiles 20 has an outer peripheral edge 36 inset from an outer edge 38 of the backing 12 and an outer perimeter 40 of the tiles 20 defining a groove 42 extending around the backsplash panel 34. Each of a plurality of links 44 is planar and L-shaped. Each of the links 44 is positionable between at least one of the tiles 20 and the backing 12 within the groove 42 such that the link 44 extends laterally outward from an outer edge 66 of the backsplash panel 34. Each of the links 44 is metal wherein each link 44 is magnetically coupled to the backing 12 of the backsplash panel 34. The backsplash panel 34 is positionable abutting an adjacently positioned backsplash panel 34 such that at least one of the links 44 aligns the backsplash panel 34 with the adjacently positioned backsplash panel 34. Each link 44 may be positioned to extend around a corner 66 of the backsplash panel 34.

In use, one of more backsplash panels 34 are positionable on the magnetically attractive surface 16 to provide decoration. Each backsplash panel 34 is removable when magnetically attached to facilitate cleaning, replacement, or reconfiguration of multiple backsplash panels 34 to periodically change the appearance as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A magnetic backsplash device comprising:
   a backing, said backing having a magnetic back face wherein said backing is configured for coupling to a magnetically attractive surface;
   a plurality of tiles;

an adhesive, said adhesive coupling each of said tiles to a front surface of said backing defining a backsplash panel configured for being displayed over the magnetically attractive surface when said backing is coupled to the magnetically attractive surface, said adhesive having an outer peripheral edge inset from an outer edge of said backing and an outer perimeter of said tiles defining a groove between said tiles and said backing, said groove extending around said backsplash panel wherein said backsplash panel is configured to be positionable abutting an adjacently positioned backsplash panel, said backsplash panel being rectangular; and a plurality of links, each of said links being planar and having a bend therein such that each said link is L-shaped, each of said links, extending over the groove between at least one of said tiles and said backing such that said link extends laterally outward from an outer edge of said backsplash panel, each of said links being metal wherein each said link is magnetically coupled to said backing of said backsplash.

2. The device of claim 1, further comprising said tiles being arranged into a plurality of rows and columns.

3. The device of claim 2, further comprising grouting positioned in gaps between said rows and said columns.

4. The device of claim 1, further comprising each of said tiles being glass.

5. A magnetic backsplash device comprising:

a backing, said backing having a magnetic back face wherein said backing is configured for coupling to a magnetically attractive surface;

a plurality of tiles, said tiles being arranged into a plurality of rows and columns, each of said tiles being glass;

grouting positioned in gaps between said rows and said columns;

an adhesive, said adhesive coupling each of said tiles to a front surface of said backing defining a backsplash panel configured for being displayed over the magnetically attractive surface when said backing is coupled to the magnetically attractive surface, said backsplash panel being rectangular, said adhesive having an outer peripheral edge inset from an outer edge of said backing and an outer perimeter of said tiles defining a groove extending around said backsplash panel between said tiles and said backing; and a plurality of links, each of said links being planar and having a respective bend such that each said link is L-shaped, each of said links being metal wherein each said link is magnetically coupled to said backing of said backsplash, each of said links extending over the groove between at least one of said tiles and said backing such that said link extends laterally outward from an outer edge of said backsplash panel wherein said backsplash panel is configured to be positionable abutting an adjacently positioned backsplash panel such that at least one of said links aligns said backsplash panel with said adjacently positioned backsplash panel.

* * * * *